2 Sheets—Sheet 1.

J. R. WHITNEY.

CHILL FOR CASTING CAR WHEELS.

No. 10,804. Reissued Feb. 1, 1887.

Witnesses
Jno. G. Hinkel, Jr.
A. E. Hansmann.

Inventor
John R. Whitney,
By his Attorneys
Arthur Freeman

N. PETERS, Photo-Lithographer, Washington, D. C.

2 Sheets—Sheet 2.

J. R. WHITNEY.

CHILL FOR CASTING CAR WHEELS.

No. 10,804. Reissued Feb. 1, 1887.

Witnesses
Jno. G. Hinkel Jr.
A. E. S. Fanomann.

Inventor
John R. Whitney
By his Attorneys
Foster & Freeman

N. PETERS, Photo-Lithographer, Washington, D. C.

UNITED STATES PATENT OFFICE.

JOHN R. WHITNEY, OF RADNOR, DELAWARE COUNTY, PENNSYLVANIA.

CHILL FOR CASTING CAR-WHEELS.

SPECIFICATION forming part of Reissued Letters Patent No. 10,804, dated February 1, 1887.

Original No. 352,793, dated November 16, 1886. Application for reissue filed December 28, 1886. Serial No. 222,843.

*To all whom it may concern:*

Be it known that I, JOHN R. WHITNEY, of Radnor township, in the county of Delaware and State of Pennsylvania, have invented certain new and useful Improvements in Chills for Casting Car-Wheels; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

The object of my invention is to secure chilled car-wheels of uniform circumference, although cast from metal of varying tempers, perfect in roundness, chilled to uniform depth in all parts of the tread, and free from pimples and blotches at the root of the flange. These objects I effect by casting the wheels against chills of practically uniform density throughout, and so constructed as to contract in diameter by the action of the heat of the molten metal alone, as fully set forth hereinafter. Wheels cast in chills so constructed are not so liable to be affected by differences in the temper of the metal as in chills of the ordinary construction, and the chills produced are very much harder and more durable.

My invention further consists in constructing the chill and combining it with the drag and cope, as fully set forth hereinafter, and as illustrated in the accompanying drawings, in which—

Figure 1:
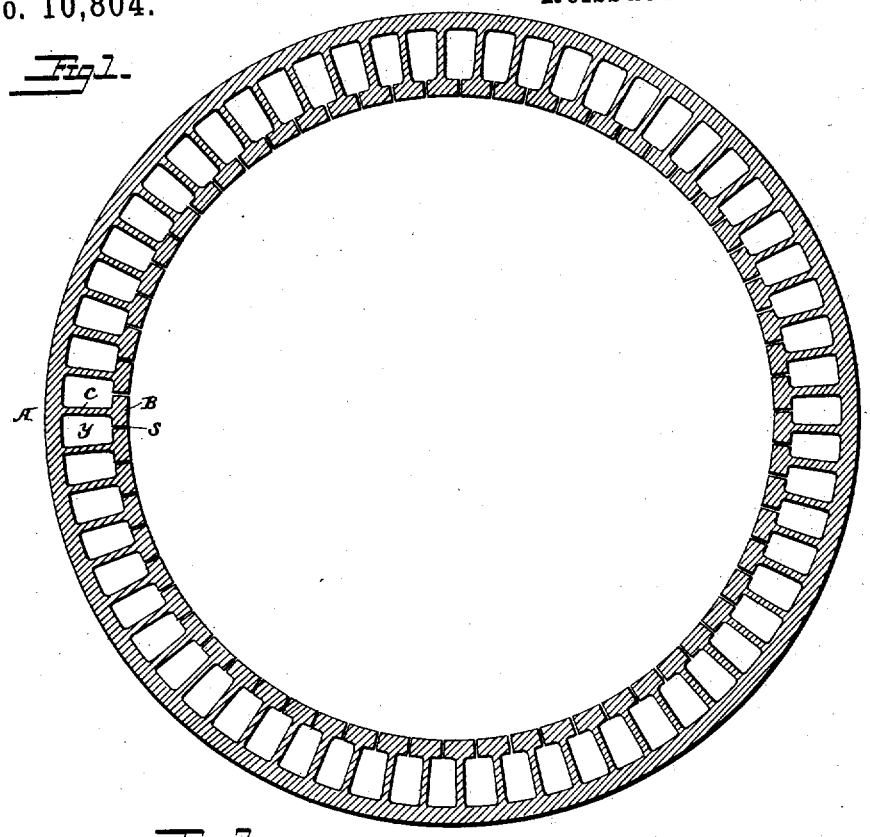
Figure 2:
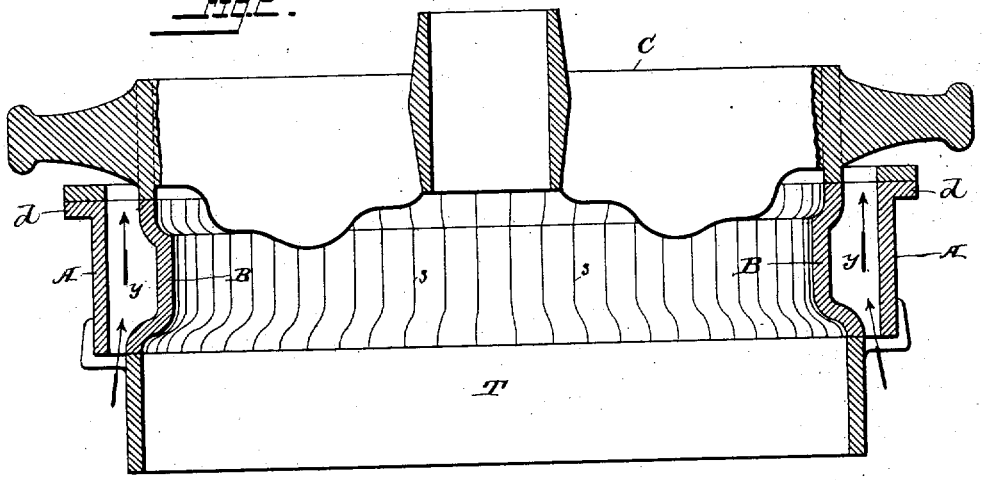
Figure 3:
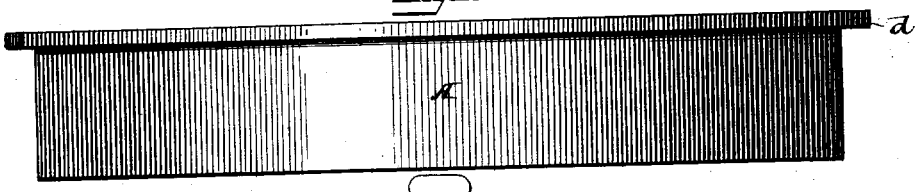
Figure 4:
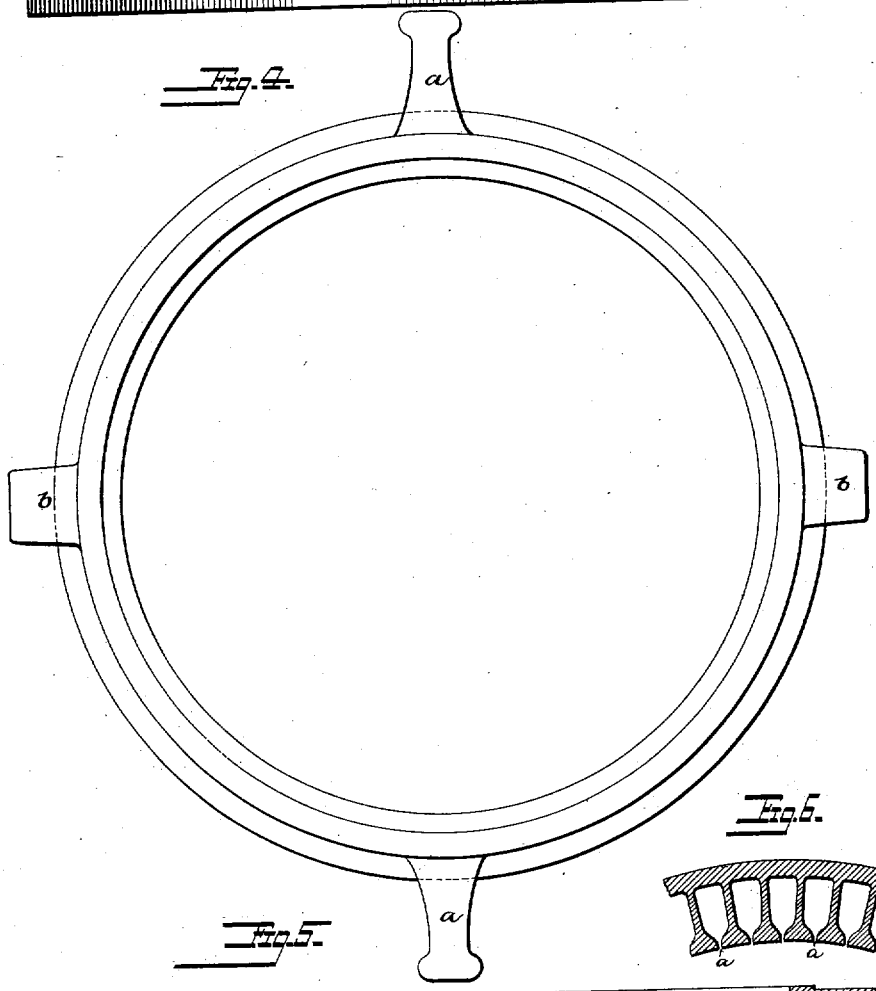
Figure 6:
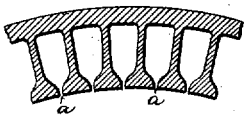
Figure 5:
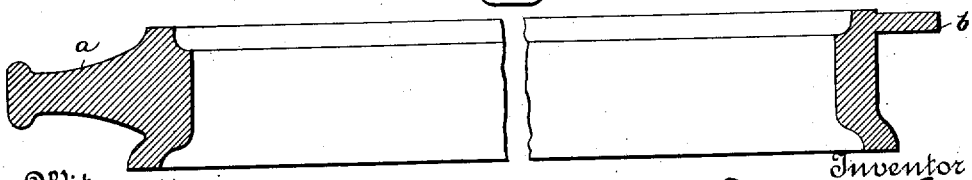

Figure 1 is a sectional plan of an improved chill constructed to carry out my invention. Fig. 2 is a vertical section of a flask, showing the arrangement of the chill therein. Fig. 3 is an edge view of the chill. Fig. 4 is a plan of the chill commonly used. Fig. 5 is a transverse section of the chill shown in Fig. 4. Fig. 6 is a portion of the plan of a chill with sections separated by saw-kerfs.

Ordinary car-wheel chills as heretofore made have consisted of solid rings of metal of about one and a half inch in thickness, and sometimes more, and provided upon opposite sides with trunnions or handles, as shown in Figs. 4 and 5. At other times the chills have consisted of rings, to which is bolted an inner facing or lining composed of separate pieces in close proximity. In other cases the chill has consisted of a hollow ring with radial and vertical sections, which are made to expand and contract by alternate currents of water and steam through the hollow ring.

In the ordinary chills above named the parts constituting the chilling-surface are of different thicknesses at different points in the circumference, and, owing to this and other features of the construction, the density of the metal varies at different points of the chilling-surface. Thus in a chill of an inch and a half in thickness, as illustrated in Figs. 4 and 5, the central portion is always much more open than the outer edges, and this inequality of texture is increased at intervals wherever there are projections, such as are formed by the trunnions *a* and lugs *b*. As a consequence, when the molten metal is poured into the mold, the chill does not expand equally at all points, and so remains in contact with the wheel longer at some points than at others, and thus produces a deeper chill wherever the contact is most prolonged. This effect is increased if the flask is out of level or the chill is unequally exposed to currents of air, &c. This unequal and irregular expansion of the chill is very apt to result in permanently altering its original shape, so that the wheels produced in it after a time become more or less out of round. As the inner surface of the ring is first heated and tends to expand before the outer portion can yield, the said inner surface also soon becomes disintegrated and loses its original smoothness of finish.

Another difficulty resulting from the employment of chills of the ordinary construction ensues from the fact that if the molten metal is of a soft, fluid, low-chilling character it retains its heat much longer than when harder and chilling well. It thus expands the chill to a much larger size before the inclosed wheel becomes solid, and as a consequence wheels made from metals of different tempers, even if cast in chills of the same diameter, when cold, will be found to vary in their circumference.

All these difficulties I overcome, partly by the use of a chill of a particular form and partly by constructing the chill, whatever may be its form, so that all parts of the chilling surface shall be of the same or nearly the same density, for I have discovered that when the chilling-surface is of uniform or nearly uniform density the chill produced is more likely to be of uniform depth, and this discovery has enabled me to secure uniform results by a proper construction of the chill.

One means of making the chill so as to secure the uniform or nearly uniform density of the chilling-surface consists in constructing it of parts substantially uniform and not exceeding one inch in thickness, and preferably very much less, so that when cast there will be no undue strains tending to condense some parts more than others. Thus, instead of making the chill in the form of a ring of one and a half inch or more in thickness and with projections at some portions, as illustrated in Figs. 4 and 5, I construct the chill with two rings, A B, each of about five-eighths or three-fourths of an inch in thickness, connected by webs, the inner ring, B, being of a uniform thickness throughout its entire extent, while the webs *c*, which connect the inner to the outer ring, are no thicker than the inner ring. I have found by actual experiment that a chilling-surface of five-eighths of an inch thickness is amply sufficient to produce deep and uniform chilling effects on the wheel if kept in contact with the tread until solid. This uniformity in the thickness of the rings and webs insures a practical uniformity of density in the chilling-ring B. The outer ring, A, is preferably made of the same thickness and entirely without trunnions or lugs, so that when the chill is heated all the parts will expand simultaneously and regularly.

To increase the efficiency of the inner ring, B, it is separated into sections by narrow slots or kerfs *s*, extending radially into the openings *y* between the webs *c*, so that each section is free to expand when heated by the molten metal of the inclosed wheel without its surface being compressed, while the expansion of all the sections and their supporting-webs causes the contraction of the inner diameter of the chill and keeps the chilling-surface in close and equal contact with the wheel at all points as long as the chilling effects are needed. While the inner ring is thus kept in contact with the wheel the outer ring, by the natural passage of air through the openings *y*, Fig. 2, remains comparatively cold, and is thus prevented from expanding during the time necessary to produce the full chilling effect. The general shape and dimensions of the chill are thus easily and permanently maintained. The chill projects beyond the cope and drag, so that the air can flow freely to and upward through and from said openings outside of the cope and drag.

Heretofore, when the inner face of the chill has been divided by radial slots, the latter have been made by means of saws or other thin cutting-tools. This involved great expense of tools and labor, and required that the sections should be comparatively thin at the points where thus cut, as shown at *a*, Fig. 6. This caused the chilling-ring to regularly vary in thickness and very materially affected its chilling powers. I have discovered, however, that a chill with slits between the sections may be made complete in the process of casting by arranging thin sheets of asbestus in the mold, so as to separate the metal in the process of casting, the refractory sheets forming cores much thinner than the smallest kerf that can be cut by saws or other tools available for such purposes, or than can be made by strips of iron or other materials commonly used as cores. By this means the sections may be made at all points of any desired thickness, with the spaces between them not exceeding one one-hundredth part of an inch in width, and in all cases less than one thirty-second of an inch, thus allowing room for the requisite expansion of the sections and consequent contraction of the chill, and yet preventing the irregularities in the casting otherwise resulting.

The arrangement of the chill in respect to the drag T and cope C is illustrated in Fig. 2, where it will be seen that the parts occupy such relative positions that the air can pass freely and naturally upward through the openings *y*, thus preserving the outer ring at such a low temperature as to prevent the alteration in the form and dimensions of the chill which would otherwise occur.

When the molten metal is brought in contact with the ordinary chill it is found that it begins to heat the same and expand it; but as soon as the metal solidifies it also itself expands, so as to remain in contact with the chill, until the solidification of the surface is complete, after which it immediately begins to contract, while the chill itself, if constructed as usual, continues to expand. If the chill is constructed in the ordinary manner, a constantly-increasing separation between the wheel and the chill thus takes place. But in the construction of the chill above described the outer ring, A, remains cold and does not expand; but the heating of the ring B and the webs *c* causes the expansion of these parts and the sections of the ring are moved inward, thus maintaining the chilling-surface in contact with the metal until the latter has become thoroughly hardened and deeply chilled. The chill thus constructed may be used in connection with the sprinkling apparatus shown in Letters Patent No. 258,182, issued to me, whereby the effects above described are much increased; but whether the sprinkling apparatus be used or the natural draft of the air alone be depended upon for keeping the outer ring of the chill at a low temperature, the effect is to produce wheels of substantially uniform circumference regardless of the temper of the metal, inasmuch as the variations in the length of time with which the metal is in contact with the chilling-surface can have no effect in changing the size of the outer ring, which serves as a fixed abutment, from which the sections of the ring may expand, and thus contract the inner diameter of the chill.

In order to permit the chill to be readily lifted, I prefer to provide the outer ring with a flange, *d*, which extends completely around the periphery, but which does not materially affect the density of the chilling-surface of the inner ring or section of the chill. This flange serves as a means of seizing the chill by the grapples when it has to be moved, and has the further advantage of permitting the chill to be easily rolled from place to place, which cannot be done when it is provided with trunnions.

The slots may be vertical; or they may extend diagonally, in which case the web *c* should also be diagonal; or the webs may be horizontal, supporting annular sections divided by horizontal slots. The other forms of chill to which reference has been made cannot be made in one casting. They are much more complicated in their parts and more costly to produce, operate, and maintain than those above described.

I do not here claim the manufacture of slotted chills by the use of thin blades or cores of refractory material, as this forms the subject of separate application for Letters Patent, and although I have specially referred to chills for making car-wheels, my invention is applicable to chills for casting various other objects, such as chilled rolls, plows, &c.

Without limiting myself to the precise construction and arrangement of parts shown, I claim—

1. A chill consisting of an outer and an inner ring or plate, the latter being divided into segments or sections by the process of casting, and the segments connected by webs with the outer ring or plate, all the parts being of such thickness as to be of equal or nearly equal density throughout, and all forming together one complete and undivided casting, substantially as set forth.

2. A chill consisting of an outer ring, an inner ring or plate divided into sections of uniform thickness throughout, and of one or more connecting-webs between each inner section and the outer ring, all formed in one complete casting, substantially as set forth.

3. A chill consisting of a solid continuous casting with its chilling-surface separated into segments or sections by the process of casting, and having air-passages, whereby the heat alone of the molten metal poured into the chill will cause its inner diameter to contract, while the air prevents the expansion of its outer diameter, substantially as set forth.

4. A chill consisting of an outer ring, an inner ring composed of a series of sections of uniform density, and connecting-webs, all forming one complete casting, substantially as set forth.

5. A chill consisting of an outer and inner ring and connecting-webs, the outer ring having an unobstructed circular periphery, for the purpose described.

6. A chill provided with an outer ring and an inner ring composed of sections supported by webs, all formed in one complete casting, with intervening slots between the sections not exceeding one thirty-second of an inch in width, for the purpose described.

7. The combination, in a molding-flask, of a cope, drag, and of a chill consisting of an inner and an outer ring connected by webs arranged to form openings *y*, arranged so as to permit upward drafts of air to pass without artificial or mechanical aid of any kind, substantially as set forth.

8. The combination of the cope, drag, and the chill, having vertical openings between its inner and outer rings, arranged with the said openings beyond the outer faces of the cope and drag, substantially as described.

In testimony whereof I affix my signature in presence of two witnesses.

JOHN R. WHITNEY.

Witnesses:

WM. S. DARLINGTON,
HENRY RAINEY.